(12) United States Patent
D'Alo et al.

(10) Patent No.: US 9,009,079 B2
(45) Date of Patent: Apr. 14, 2015

(54) PLANNING ASSIGNMENT OF SOFTWARE LICENSES

(75) Inventors: Salvatore D'Alo, Rome (IT); Arcangelo Di Balsamo, Aprilla (IT); Alessandro Donatelli, Rome (IT); Claudio Marinelli, Aprilla (IT)

(73) Assignee: International Business Machines Corporation, Armonk, NY (US)

( * ) Notice: Subject to any disclaimer, the term of this patent is extended or adjusted under 35 U.S.C. 154(b) by 1652 days.

(21) Appl. No.: 11/427,431

(22) Filed: Jun. 29, 2006

(65) Prior Publication Data

US 2007/0005505 A1 Jan. 4, 2007

(30) Foreign Application Priority Data

Jul. 1, 2005 (EP) .................................... 05105994

(51) Int. Cl.
- *G06F 21/00* (2013.01)
- *G06F 7/04* (2006.01)
- *G06Q 10/10* (2012.01)
- *G06Q 10/02* (2012.01)

(52) U.S. Cl.
CPC ................ *G06Q 10/10* (2013.01); *G06Q 10/02* (2013.01)

(58) Field of Classification Search
USPC .................................... 705/59; 726/31; 710/5
See application file for complete search history.

(56) References Cited

U.S. PATENT DOCUMENTS

| | | | | |
|---|---|---|---|---|
| 5,260,999 A * | 11/1993 | Wyman | ............................ | 705/59 |
| 5,671,412 A * | 9/1997 | Christiano | ................. | 707/104.1 |
| 5,790,664 A * | 8/1998 | Coley et al. | ................... | 709/203 |
| 5,925,127 A * | 7/1999 | Ahmad | ............................ | 726/31 |
| 5,948,040 A * | 9/1999 | DeLorme et al. | ............. | 701/426 |
| 6,073,124 A * | 6/2000 | Krishnan et al. | ................ | 705/59 |
| 6,151,707 A * | 11/2000 | Hecksel et al. | ............... | 717/178 |
| 6,189,146 B1 * | 2/2001 | Misra et al. | .................... | 717/177 |
| 6,304,905 B1 * | 10/2001 | Clark | ............................. | 709/224 |
| 6,308,271 B2 * | 10/2001 | Tanaka | .............................. | 726/7 |
| 6,345,386 B1 * | 2/2002 | Delo et al. | ..................... | 717/176 |
| 6,353,928 B1 * | 3/2002 | Altberg et al. | ................ | 717/175 |
| 6,389,538 B1 * | 5/2002 | Gruse et al. | ................... | 713/194 |
| 6,389,589 B1 * | 5/2002 | Mishra et al. | ................. | 717/170 |
| 6,397,381 B1 * | 5/2002 | Delo et al. | ..................... | 717/174 |
| 6,418,554 B1 * | 7/2002 | Delo et al. | ..................... | 717/174 |
| 6,427,227 B1 * | 7/2002 | Chamberlain | ................ | 717/124 |
| 6,442,529 B1 * | 8/2002 | Krishan et al. | ............. | 705/14.52 |
| 6,502,079 B1 | 12/2002 | Ball et al. | | |
| 6,523,166 B1 * | 2/2003 | Mishra et al. | ................. | 717/174 |
| 6,539,501 B1 * | 3/2003 | Edwards | ......................... | 714/45 |
| 6,578,199 B1 * | 6/2003 | Tsou et al. | ..................... | 717/178 |

(Continued)

*Primary Examiner* — Evens J Augustin
(74) *Attorney, Agent, or Firm* — Yee & Associates, P.C.; Jeffrey S. LaBaw

(57) ABSTRACT

A method (300) for planning assignment of floating licenses of software products is proposed. Floating licenses can be requested to a runtime server by multiple workstations (to which they are assigned until a maximum number of instances of the product are running concurrently). In the solution of the invention, a user of every workstation needing to run the product in a future timeframe submits (306) a corresponding reservation request to the runtime server. If at least one license is available for the selected timeframe, the runtime server reserves (357) the license to the workstation (so as to prevent assigning it to other workstations for the same period); at the same time, a corresponding temporary permission is stored (360) on the workstation. In this way, the product can be used (363-387) during the selected timeframe on the workstation only; this is possible without any risk even if the workstation is disconnected from the runtime server.

4 Claims, 7 Drawing Sheets

(56) References Cited

U.S. PATENT DOCUMENTS

| | | | |
|---|---|---|---|
| 6,750,978 B1 * | 6/2004 | Marggraff et al. | 358/1.12 |
| 6,766,305 B1 * | 7/2004 | Fucarile et al. | 705/51 |
| 6,813,765 B1 * | 11/2004 | Flores | 717/174 |
| 6,816,882 B1 * | 11/2004 | Conner et al. | 709/203 |
| 6,834,245 B2 * | 12/2004 | Ota et al. | 702/84 |
| 6,836,794 B1 * | 12/2004 | Lucovsky et al. | 709/223 |
| 6,948,183 B1 * | 9/2005 | Peterka | 725/25 |
| 6,957,195 B1 * | 10/2005 | Kenyon et al. | 705/58 |
| 6,976,219 B2 * | 12/2005 | Morita et al. | 715/748 |
| 7,020,635 B2 * | 3/2006 | Hamilton et al. | 705/51 |
| 7,069,228 B1 * | 6/2006 | Rose et al. | 705/5 |
| 7,073,172 B2 * | 7/2006 | Chamberlain | 717/169 |
| 7,080,228 B2 * | 7/2006 | Huras et al. | 711/170 |
| 7,096,203 B2 * | 8/2006 | Pence et al. | 705/59 |
| 7,096,504 B1 * | 8/2006 | Tagawa et al. | 726/27 |
| 7,127,069 B2 * | 10/2006 | Nguyen | 380/278 |
| 7,155,414 B2 * | 12/2006 | Barritz et al. | 705/59 |
| 7,159,244 B2 * | 1/2007 | Matsushima et al. | 726/30 |
| 7,168,089 B2 * | 1/2007 | Nguyen et al. | 726/4 |
| 2002/0103681 A1 * | 8/2002 | Tolis et al. | 705/5 |
| 2005/0043973 A1 * | 2/2005 | Childers | 705/5 |
| 2005/0044281 A1 * | 2/2005 | McCarthy | 710/5 |

* cited by examiner

PLANNING ASSIGNMENT OF SOFTWARE LICENSES

FIELD OF THE INVENTION

The present invention relates to the data processing field. More specifically, the present invention relates to the control of usage of products in a data processing system (such as a license management system).

BACKGROUND ART

Software products (such as computer programs) can be perfectly reproduced in an infinite number of copies. This is a major concern for vendors of the products wishing to protect their intellectual property rights (since any unaccounted use of the products results in unpaid royalties). The problem has been exacerbated in the last years by the widespread diffusion of the Internet, which further facilitates the uncontrolled distribution of this kind of products.

Typically, the vendor grants a license to use every product under specific terms and conditions. For example, in the case of a product subjected to a so-called "shrink-wrap" license (which is implicitly accepted upon opening its package), a user owning a hard-copy license certificate can install and run the product on any personal computer at a time. Alternatively, the vendor may provide a company with a multiple license for the same product; accordingly, it is possible to use the product concurrently on any computers up to a maximum number defined by the license.

In the above-mentioned situations, the control of the compliance with the applicable licenses is only left to the users. This operation is complex, time consuming and prone to errors. In any case, it is very difficult (if not impossible) to prevent unauthorized usage of the products. The problem is particular acute in large companies having thousands of computers.

Licensing applications have also been proposed in the last years to assist an administrator in efficiently controlling usage of products in a data processing system with distributed architecture. An example of licensing application is the "Tivoli License Manager" (or TLM) by IBM Corporation. The licensing application is based on a central server, which stores information about the licenses available for the system. A mechanism is then implemented for detecting the products running on the corresponding computers. For example, the products are instrumented to call the server before starting; more generally, an agent running on the background periodically detects the products that are running or it intercepts the launching of any new product. In any case, the products in execution on the computer are notified to the server; the server verifies whether the usage of each product is authorized and then allows the product to start or forces it to stop accordingly. This solution makes it possible to meter the actual usage of the products in the system and provides an efficient support for allocating the available licenses correctly.

Generally, the licensing application is capable of managing licenses based on a number of different policies; for example, the licenses may be restricted to a specific computer, may be reserved to a particular user, or may be distributed to a network of computers. A commonplace situation arises when the same license (also known as concurrent floating license) is shared among users of multiple computers. In this case, any computer may access the same product. Whenever a user needs to run the product, it submits a corresponding request to the server. The server authorizes different instances of the product to run (on corresponding computers) up to the maximum number of licenses thereof that are available.

However, in the above-described scenario a user needing to run the product may receive a refusal by the server (when all the licenses are already assigned to other users).

Therefore, the user is unable to perform the desired task until a corresponding license is released. This may adversely affect the activities of the user (with a possible impact on other correlated activities).

The above-mentioned drawbacks are particular acute when the use of the product relates to critical business aspects.

SUMMARY OF THE INVENTION

The present invention proposes a solution, which is based on the idea of reserving the licenses for their future use.

Particularly, an aspect of the invention proposes a method for controlling usage of digitally encoded products (such as software products) in a data processing system. Each product is associated with a set of (one ore more) usage rights (or licenses); these usage rights enable data processing entities (such as workstations) to which they are assigned to use the product. The method involves the execution of a series of steps (for example, under the control of a runtime server). Particularly, the method starts by receiving a reservation request of a selected product for a selected period (or timeframe) by an entity; the start of the selected period is delayed with respect to the reservation request. A usage right of the selected product is reserved for the selected period to the entity in response to the reservation request; this prevents assigning the reserved usage right for the selected period to other entities (with the reserved usage right that remains available for assignment until the start of the selected period). The reserved usage right can now be assigned to the entity in connection with the selected period.

In a preferred embodiment of the invention, a temporary permission is stored on the workstation, so as to enable and disable the use of the product locally at the start time and at the end time, respectively, of the selected timeframe.

As a further enhancement, the reserved license is released if the product is not used within a predefined delay in the selected timeframe (for example, after its start time).

In a further embodiment of the invention, when no license is available the runtime server attempts releasing a reserved license (or more) before refusing the reservation request.

In a specific implementation, this result is achieved sending a corresponding request to a set of workstations.

Preferably, the set of workstations is selected according to a residual duration of the corresponding timeframes.

In addition or in alternative, the runtime server automatically releases a reserved license with a priority lower than the one of the reservation request.

A way to improve the solution is of suggesting one or more alternative timeframes (when no license is available).

A further aspect of the present invention proposes a computer program for performing the above-described method.

Moreover, another aspect of the present invention proposes a corresponding system.

The characterizing features of the present invention are set forth in the appended claims. The invention itself, however, as well as further features and the advantages thereof will be best understood by reference to the following detailed description, given purely by way of a nonrestrictive indication, to be read in conjunction with the accompanying drawings.

REFERENCE TO THE DRAWINGS

DETAILED DESCRIPTION

Figure 1A:
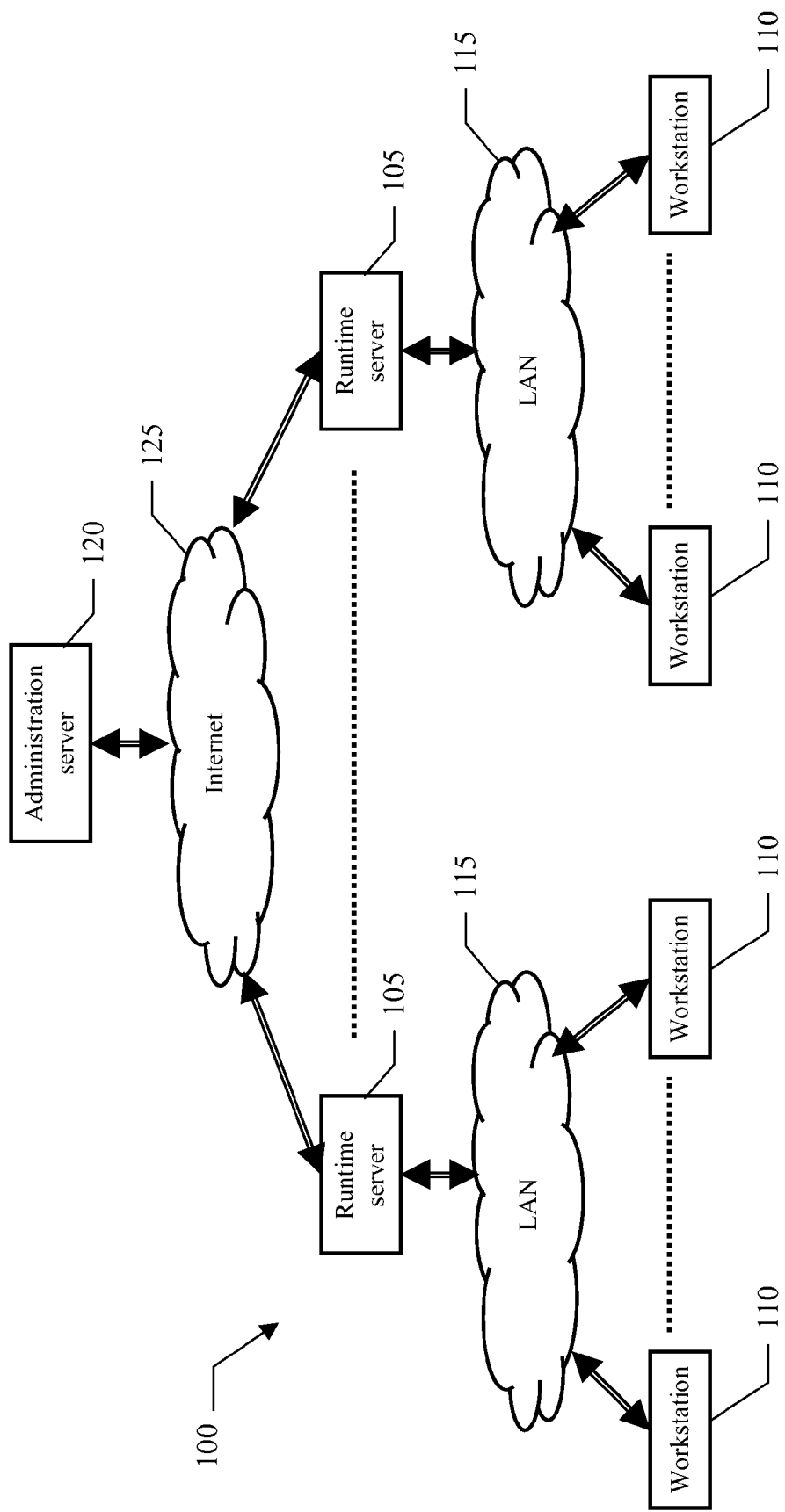
FIG. 1a is a schematic block diagram of a data processing system in which the solution according to an embodiment of the invention is applicable.

With reference in particular to FIG. 1a, a data processing system 100 with distributed architecture is depicted. The system 100 implements a license management infrastructure (for example, based on the above-mentioned TLM), which allows controlling the usage of software products (such as computer programs). The system 100 includes one or more independent organizations (only one shown in the figure), which are completely separate and distinct from each other. Within the organization, one or more divisions are defined. Each division is formed by a runtime server 105, which directly controls the usage of assigned products on a set of corresponding client workstations (or nodes) 110; for this purpose, the runtime server 105 and all the workstations 110 of the division communicate through a network 115 (for example, a LAN). The different runtime servers 105 report to a single administration server 120, which implements a central control point of the whole organization; the runtime servers 105 and the administration server 120 are connected to a different network 125 (for example, INTERNET-based).

Figure 1B:
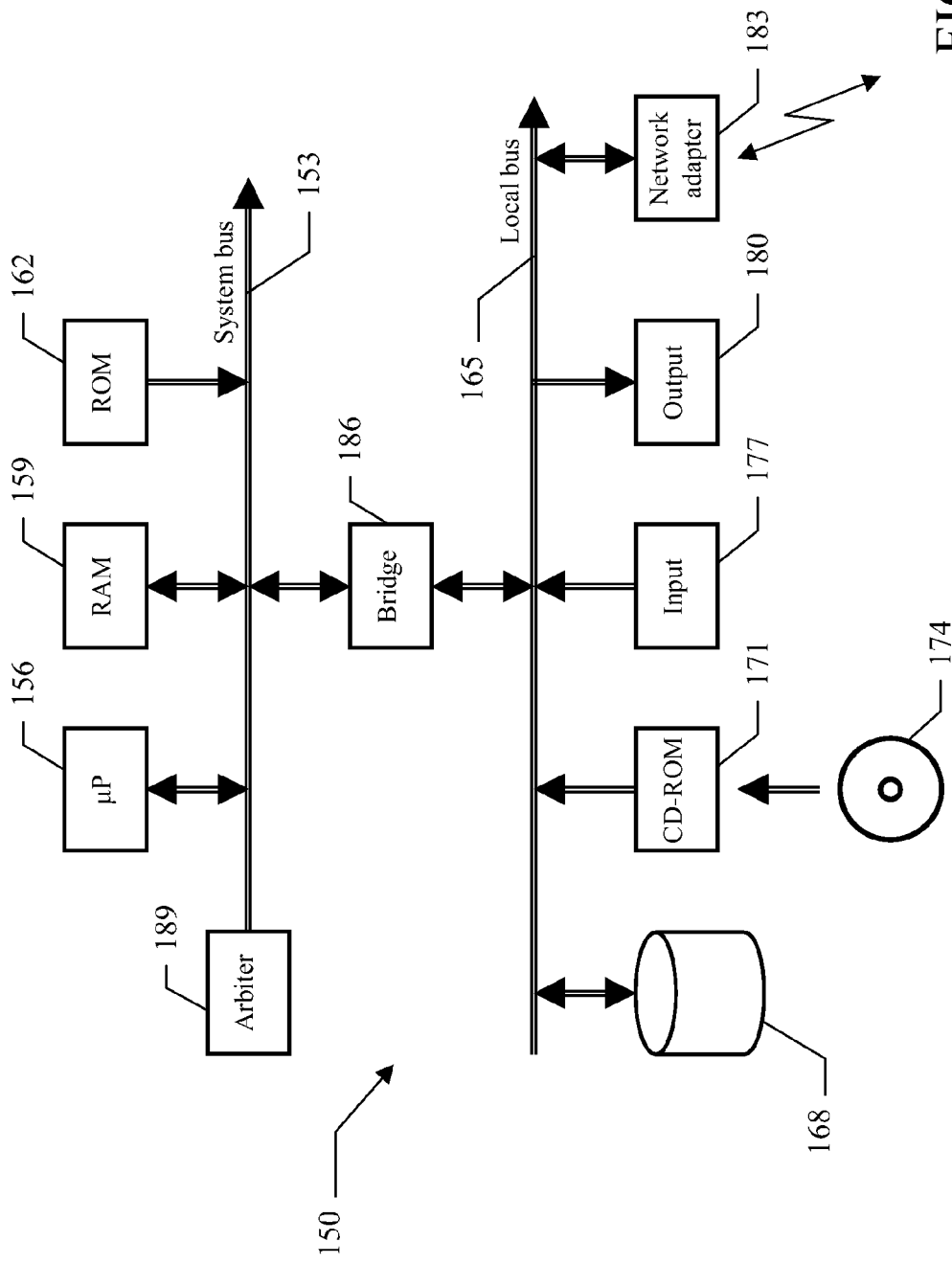
FIG. 1b shows the functional blocks of an exemplary computer of the system.

Considering now FIG. 1b, a generic computer of the system (runtime server, workstation or administration server) is denoted with 150. The computer 150 is formed by several units that are connected in parallel to a system bus 153. In detail, one or more microprocessors (µP) 156 control operation of the computer 150; a RAM 159 is directly used as a working memory by the microprocessors 156, and a ROM 162 stores basic code for a bootstrap of the computer 150. Several peripheral units are clustered around a local bus 165 (by means of respective interfaces). Particularly, a mass memory consists of one or more hard-disks 168 and drives 171 for reading CD-ROMs 174. Moreover, the computer 150 includes input units 177 (for example, a keyboard and a mouse), and output units 180 (for example, a monitor and a printer). An adapter 183 is used to plug the computer 150 into the system. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
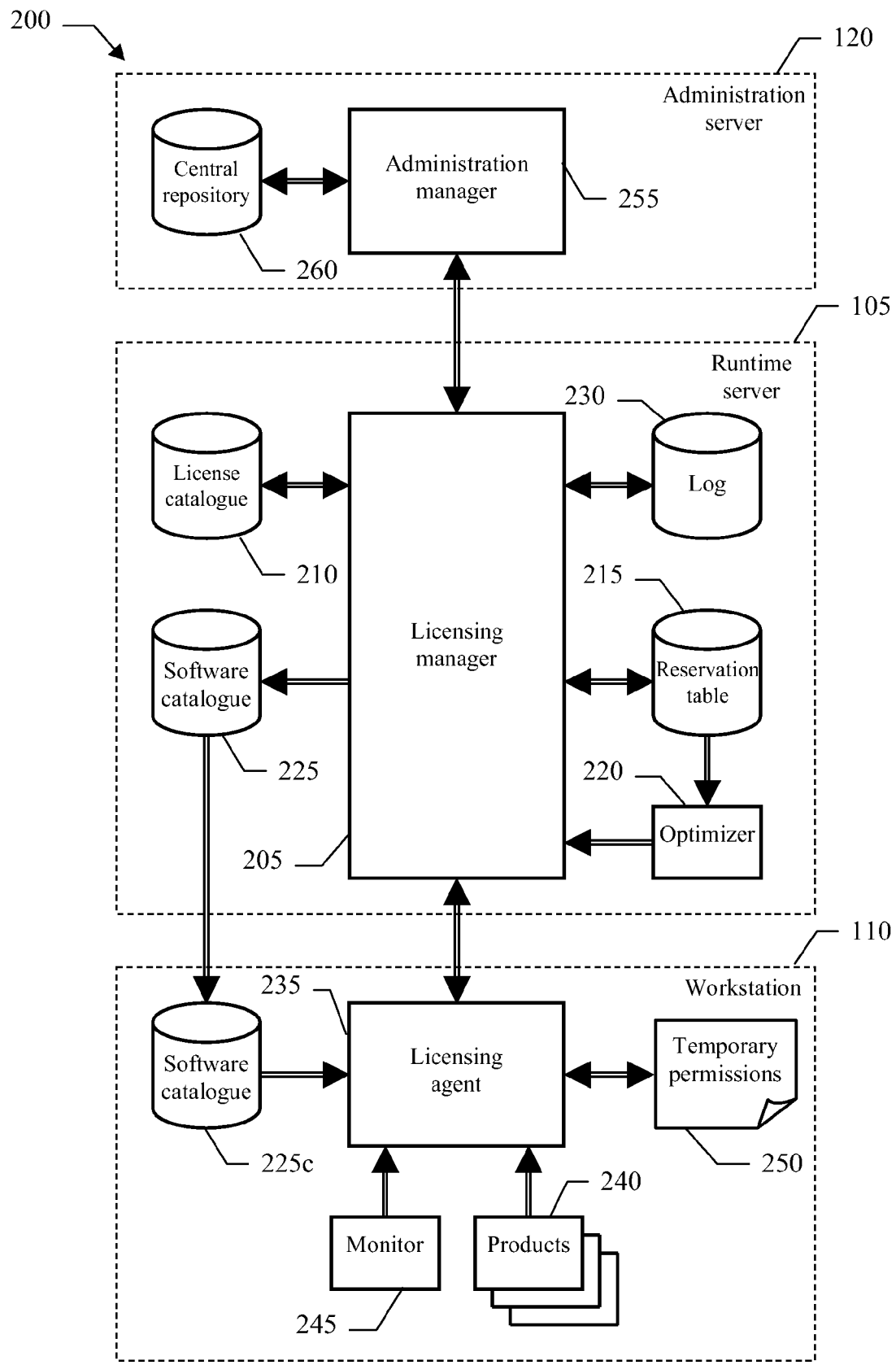
FIG. 2 depicts the main software components that can be used for implementing the solution according to an embodiment of the invention.
Figure 3A:
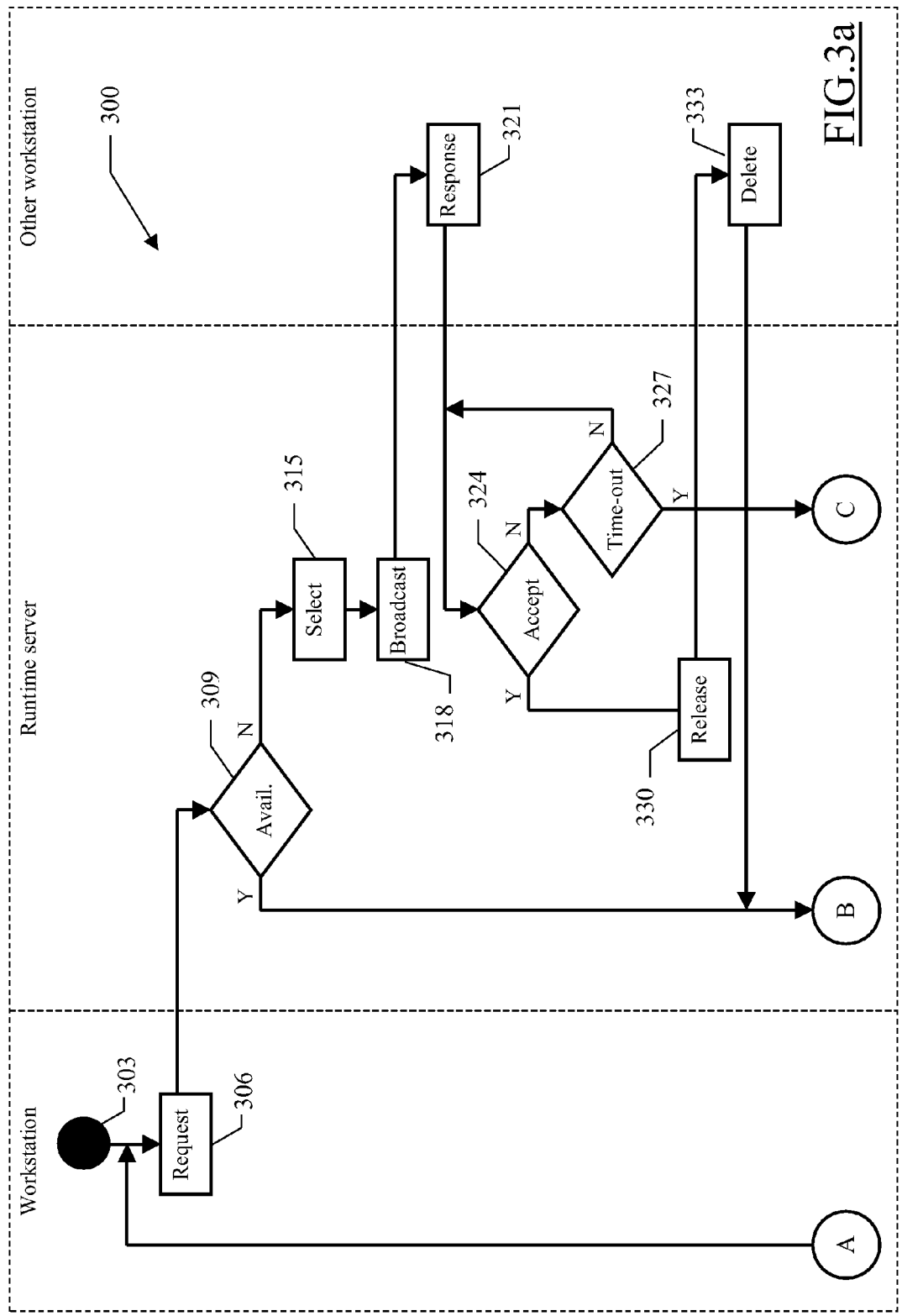
FIGS. 3a-3d show a diagram describing the flow of activities relating to an implementation of the solution according to an embodiment of the invention.
Figure 3B:
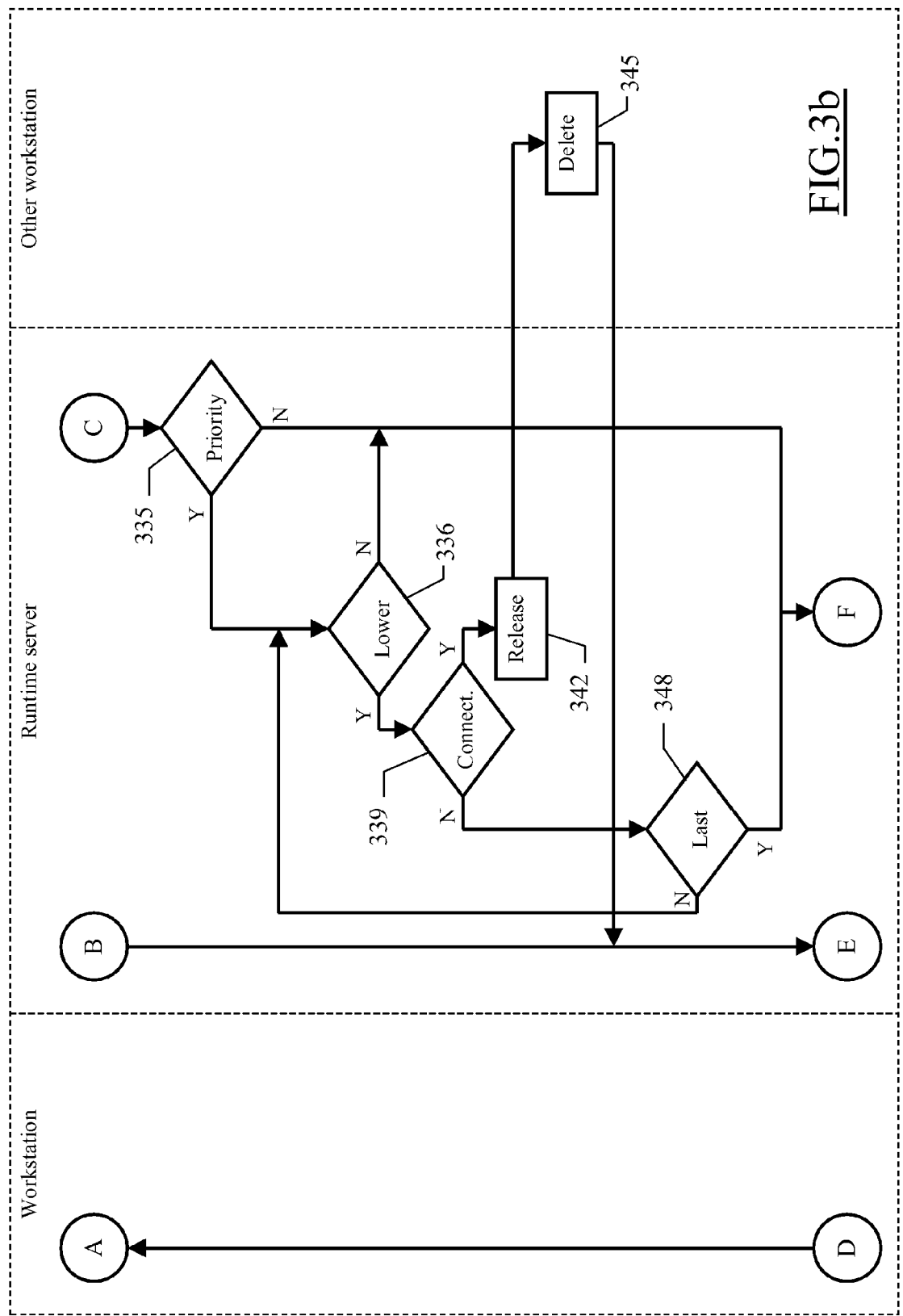
Figure 3C:
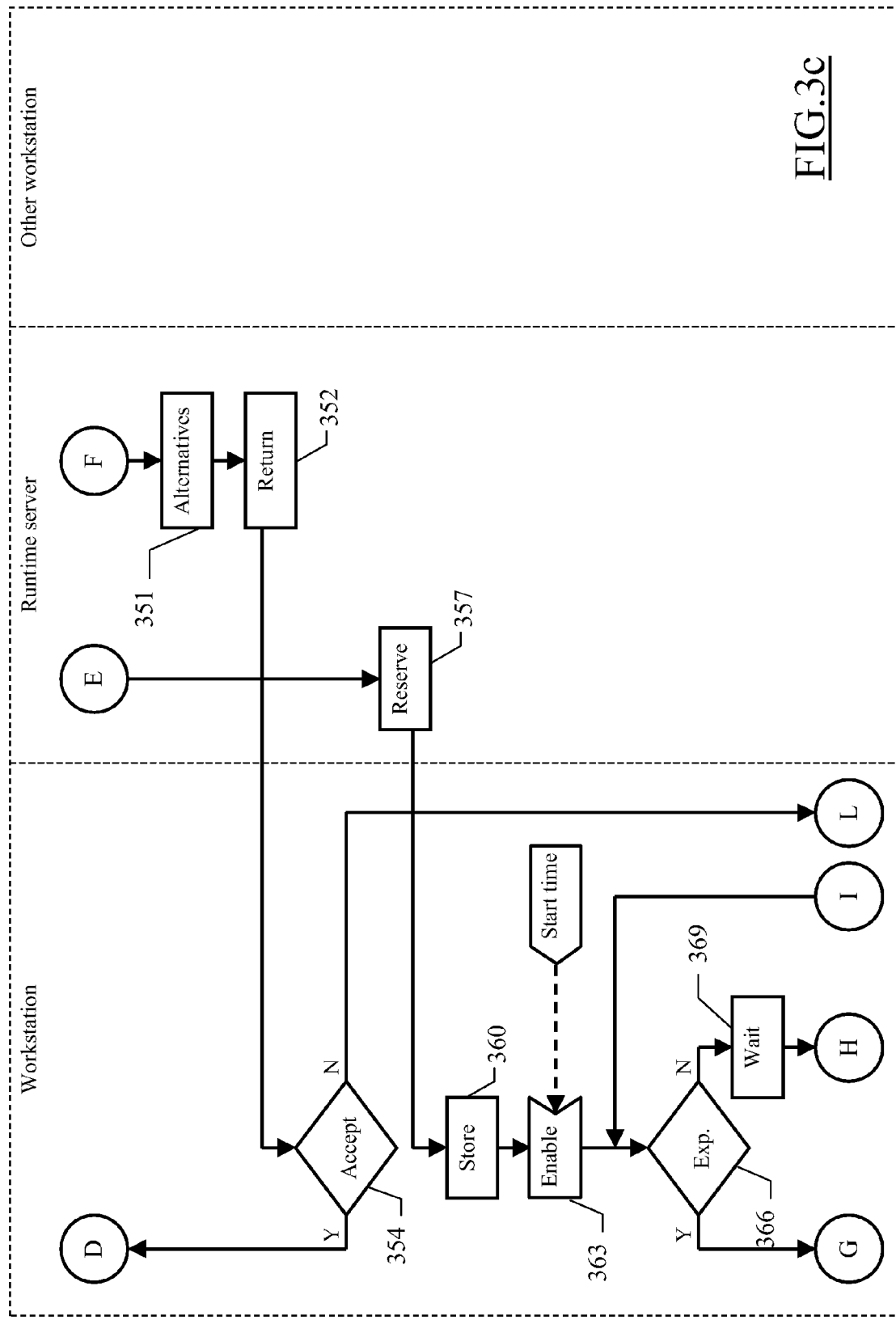
Figure 3D:
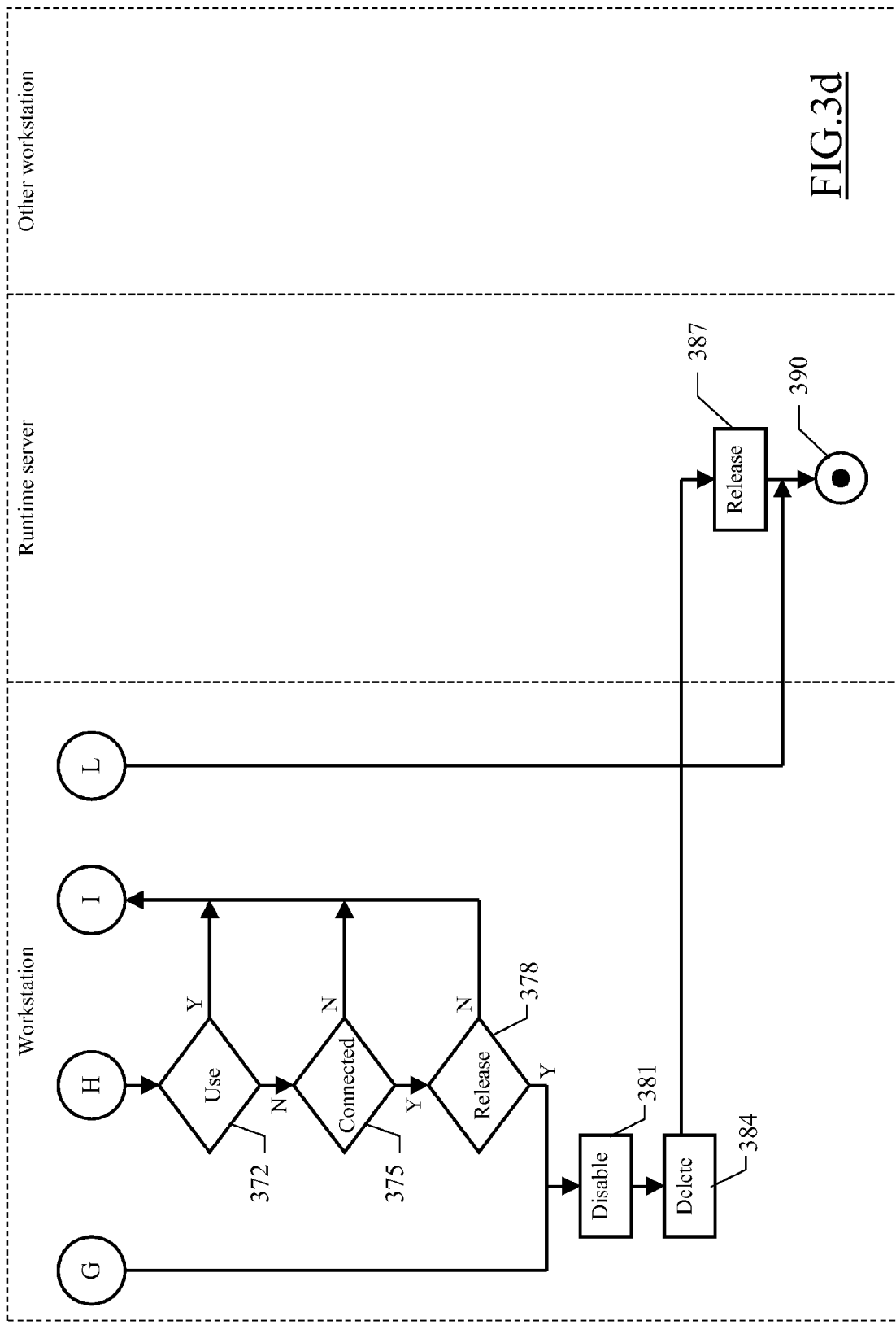

Moving to FIG. 2, the main software components that run on the above-described system are denoted as a whole with the reference 200. The information (programs and data) is typically stored on the hard-disk and loaded (at least partially) into the working memory of each computer when the programs are running, together with an operating system and other application programs (not shown in the figure). The programs are initially installed onto the hard-disk, for example, from CD-ROM.

Considering in particular the runtime server 105 of a generic division, a licensing manager 205 controls the associated workstations. The licensing manager 205 accesses a corresponding catalogue 210, which stores a predefined number of electronic licenses for each product authorized to run in the division. Each license defines a usage right of the product, which enables a workstation to run the corresponding product when assigned to it. In addition, the license may specify any kind of authorized conditions of use of the product set by its vendor (such as the maximum processing power or the maximum capacity of the working memories of the workstations on which the product is allowed to run).

The licensing manager 205 also controls a reservation table 215. As described in detail in the following, the reservation table 215 lists the licenses that are currently reserved in the division; particularly, the reservation of each license specifies the workstation requesting it for a specific timeframe (defined by a start time and an end time). When the start time of the timeframe has not been reached yet, the reservation indicates that the workstation has requested to use the corresponding product for the future; this prevents assigning the license to other workstations for the desired timeframe (so as to be available for the corresponding workstation at the relevant time). Conversely, when the start time has already elapsed, the reservation indicates that the product is allegedly running on the workstation (and the license is currently assigned to the workstation). The reservation table 215 is also accessed by an optimizer 220; the optimizer 220 is invoked by the licensing manager 205 for suggesting allocation strategies of the licenses available in the division (according to their current status extracted from the reservation table 215).

In addition, the runtime server 105 stores a software catalogue 225, which lists all the known products to be metered in the organization. Each product is identified by a signature defined by one or more executable modules, which indicate the usage of the product when in execution; typically, each module is specified in the software catalogue 225 by means of multiple attributes (such as its name, size and checksum), so as to improve the accuracy of the identification. The licensing manager 205 also collects information from the corresponding workstations (for example, about the installed products, any attempts to use non-authorized or unknown products, and the like); this information is stored into a corresponding log 230.

Considering now a generic workstation 110 of the same division, a licensing agent 235 (continually running in the background) interfaces with the licensing manager 205 for controlling the usage of any products 240 installed on the workstation 110. For this purpose, the licensing agent 235 communicates with a monitor 245, which periodically detects all the modules that are running on the workstation 110 (for example, requesting the list of the modules associated with the active processes to its operating system). The licensing agent 235 then identifies the corresponding products in use on the workstation 110 (if known); for this purpose, the licensing agent 235 accesses a copy of the software catalogue 225 (denoted with 225c), which is downloaded from the licensing server 105 (for example, periodically or at any change thereof). The licensing agent 235 grants or denies the authorization to use each product according to corresponding temporary permissions 250 that are received from the runtime server 105; as it will be apparent in the following, the receiving of the temporary permissions 250 is completely asynchronous with respect to the use of the products (so that a connection between the workstation 110 and the runtime server 105 is not required for managing the authorizations). Each temporary permission 250 enables the workstation 105 to run a specific product for a desired timeframe (during which the corresponding license is assigned to the workstation 105); the temporary permission 250 always has a corresponding entry in the reservation table 215 (i.e., a reservation of the respective license for the same timeframe to the workstation). At the end, an administration manager 255 running on the corresponding server 120 interfaces with the licensing managers 205 of all the runtime servers 105 in the organization. The administration manager 255 controls a central repository 260 storing inventory, procurement, and usage information for the whole organization. Particularly, the administration manager 255 distributes the licenses and the software catalogue 225 to and collects the logs 230 from the different runtime servers 105.

Moving now to FIGS. 3a-3d, the logic flow of an exemplary process that can be implemented in the above-described system (for running selected products) is represented with a method 300. The method 300 begins at the black start circle 303 in the swim-lane of a generic workstation. Passing to block 306, a user of the workstation submits a reservation request to its runtime server; the reservation request specifies a selected product that he/she needs to use in a selected timeframe. The timeframe can relate to either a future use (in which case both a start time and an end time must be specified) or to an immediate use (in which case the start time is set to the current time). Preferably, the reservation request for the immediate use of the product can also be submitted automatically when the licensing agent detects that a product (for which no license had been reserved) has been launched by the user; in this case, it is also possible to avoid any manual intervention of the user by setting the end time of the corresponding timeframe to a default value (such as 1-2 hours). This additional feature allows combining the proposed solution with a standard mode of operation of the licensing infrastructure (usage-based instead of reservation-based). The reservation request may also be associated with a corresponding priority index (for example, from 0 to 10 in decreasing priority order); the priority of the reservation request is selected manually by the user, or it is associated automatically with the workstation or with the user (either on the workstation itself or on the runtime server).

In response to the reservation request, the runtime server at block 309 verifies whether any license of the product is available for the timeframe. For this purpose, the licensing manager counts the licenses of the product that have already been reserved for this timeframe; the verification provides a positive result when this number does not reach the one of the licenses that have been granted to the division (as indicated in the license repository).

If all the licenses of the product have already been reserved for the timeframe, the method proceeds to block 315. In this phase, the licensing manager selects a set of those reserved licenses for which the residual duration of the respective timeframe (i.e., the difference between the end time of the timeframe and the current time) is lower than a threshold value (for example, 10-20 minutes); as a result, the selection is restricted to the reserved licenses that are about to be released (so that it is more likely that the use of the product has already been terminated). Continuing to block 318, the licensing manager broadcasts a release request for the workstations to which the selected licenses have been reserved (for determining whether the corresponding reserved licenses are still necessary). Moving to block 321, the user of a generic one of those (selected) workstations returns a response to the runtime server (if the selected workstation is connected to it). When the user of the selected workstation still needs to use the product (block 324), a test is made at block 327 to verify whether a predefined time-out from the receipt of the reservation request has expired (for example, 1-5 minute). If not, the flow of activity returns to block 324 waiting for the response to the release request by another selected workstation. As soon as a positive response to the release request is received at block 324 from a selected workstation (since the use of the product on that workstation is not necessary any longer), the method enters block 330; accordingly, the corresponding reserved license is released by deleting it from the reservation table. The licensing server then notifies the selected workstation, which deletes the respective temporary permission at block 333.

Referring back to block 327, when no reserved license has been released at the expiry of the time-out, the flow of activity branches at block 335. When the reservation request specifies a priority index, the licensing manager at block 336 verifies whether one or more of the reserved licenses are associated with a lower priority. If so, a loop is performed for processing each one of those lower-priority reserved licenses (in increasing priority order). The loop begins at block 339, wherein the licensing manager determines whether the corresponding workstation is connected. If so, the licensing manager at block 342 releases the reserved license by deleting it from the reservation table, and then notifies that workstation accordingly. In response thereto, the monitoring agent on the workstation deletes the respective temporary permission at block 345 (preferably, this process involves some sort of interaction with the user of the workstation, for example, giving him/her a short time for saving the data and closing the product safely). Conversely, if the workstation is not connected (block 339), a test is made at block 348 to determine whether all the lower-priority reserved licenses have been processed. If not, the method returns to block 336 to repeat the same operations on the next lower-priority reserved license.

When the above-described operations are unable to release the required license, the flow of activity enters block 351 (either from block 335 or from block 348). For example, this situation occurs (when no priority index is specified in the reservation request) because all the selected workstations still need to use to product, or because they do not respond or are not connected to the runtime server (so that it is impossible to have information about the actual use of the product); likewise, when the reservation request specifies a priority index, it is possible that all the workstations corresponding to the lower-priority reserved licenses are disconnected, or that no reserved license of lower priority is found. In this phase, the optimizer determines one or more alternative timeframes for which at least one license of the product is not reserved yet; for example, the optimizer shifts the required timeframe back and forth until an available period is found (or a maximum allowable offset is reached). In this way, it is possible to implement some sort of planning of the use of the licenses. Considering now block 352, the licensing manager returns the alternative timeframes so determined (if any) as a suggestion to the user of the workstation. In response thereto, if the user at block 354 accepts one of those alternative timeframes, the flow of activity goes back to block 306 so as to submit a new reservation request (for the same product) based on that alternative timeframe.

Referring back to block 309, when at least one license of the product is available for the desired timeframe the method descends into block 357; the same point is also reached from block 333 or from block 345 after a reserved license for the same timeframe has been released in a voluntary or preemptive manner, respectively. In the case of voluntary release, the reserved licenses that are no longer necessary are made available so as to avoid blocking the workstation uselessly (by other workstations that have already terminated using the product); in the case of preemptive release, the system revokes the reserved licenses to other workstations so as to serve privileged users having critical business needs. In any case, a license of the product is now reserved for the desired timeframe to the workstation that has submitted the corresponding request (by updating the reservation table accordingly). The licensing manager then transmits a respective temporary permission to the workstation; this temporary permission is stored on the workstation at block 360.

As soon as the start time of the timeframe is reached, the flow of activity passes to block 363; in this phase, the product is enabled to run on the workstation by the corresponding temporary permission. It should be noted that this behavior does not require any connection with the runtime server (since the corresponding license has already been reserved for the timeframe and then it is assigned to the workstation automatically); therefore, the proposed solution allows enabling the workstations to use any products with no risk of exceeding the available licenses (even when the workstations are disconnected from the runtime server). A typical scenario is that of a user needing to work with a product late at home. In this case, the user can reserve the corresponding license for the desired timeframe at the office during the day (when his/her workstation is connected to the runtime server); assuming that the required license has been reserved by the runtime server (storing the corresponding temporary permission on the workstation), the product can be used for the desired timeframe without any need to connect to the runtime server at home.

Continuing to block 366, a test is made to verify whether the timeframe has expired (i.e., its end time has been reached). If not, the process enters a waiting block 369. After a predetermined delay (for example, 5-10 minutes), the licensing manager at block 372 verifies whether the product is actually running on the workstation. If so, the method returns to block 366 for reiterating the process. Conversely, the flow of activity branches at block 375 according to the condition of the workstation. Particularly, if the workstation is disconnected from the runtime server the method again returns to block 366 (since it is not possible to inform the runtime server accordingly). On the contrary, the user of the workstation is prompted to decide whether he/she still needs the reserved license. If the user means to use the product later on, the method goes back to block 366 without performing any action. On the other hand, when the product is not to be used any longer, its running is disabled at block 381; the same point is also reached from block 366 once the timeframe expires (preferably, after giving the user a short time for saving the data and closing the product safely). Continuing to block 384, the corresponding temporary permission is deleted from the workstation. The licensing manager then releases the reserved license at block 387 (by deleting it from the reservation table). In this way, it is possible to avoid keeping reserved a license when it is not used (with a predefined delay after the start time of the selected timeframe or after any stop of the product). The method ends at the concentric white/black stop circles 390; the same point is also reached from block 354 directly when no license is available for the selected timeframe (or for any alternative timeframe).

It should be noted that this asynchronous behavior is actually implemented with a synchronous procedure. Particularly, the licensing agent periodically retrieves the list of the modules in execution on the workstation (defined by their names). Each module is accessed so as to extract its attributes (the size and the checksum in the example at issue); those attributes are then compared with the one specified in the entry of the software catalogue for the name of the module. If the attributes of the module match the ones indicated in the software catalogue, the corresponding product is identified (conversely, if the name of the module is not included in the software catalogue or if the result of the matching is negative the product is set as unknown). For each (known) product in execution, the licensing manager verifies whether a corresponding temporary permission is available at the moment (i.e., its timeframe includes the current time). As a result, the executions of the authorized products continue, while the other processes are closed (so as to stop execution of the corresponding unauthorized products).

In the above-described solution, any user may reserve the desired licenses for future use (so as to be sure that the licenses will be always available when necessary).

This strongly reduces the risk for the user to be unable to perform the desired tasks; in any case, the user can plan his/her activities according to the information that is available in advance (for example, postponing other correlated activities so as to minimize any negative impact on them).

All of the above has a beneficial effect for the user (especially when his/her activities relate to critical business aspects).

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent units. Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like).

It should be readily apparent that the application of the present invention is not limited to any specific licensing application and/or technique for identifying the products launched or in use on the workstations; likewise, the licenses may be of any other type or they may be replaced with equivalent usage rights.

Without departing from the principles of the invention, the same concepts may be applied to control the usage of audio and video recordings, electronic books, multimedia works, or any other digitally encoded products.

Alternatively, nothing prevents a completely automatic implementation wherein all the requests and responses are managed by other programs (configured to reserve the desired products for future use).

Moreover, the temporary permissions may be replaced with any equivalent control information (for example, a table listing all the products that are authorized to run in each period). In any case, a simplified implementation wherein the authorizations to run are always granted in real-time by the runtime server is not excluded (even if it does not support the use of the products when the workstations are disconnected from the runtime server).

Similar considerations apply if the time-out for releasing the reserved license when it is not used is defined in another way (for example, as a percentage of the corresponding timeframe); alternatively, it is possible to verify the use of the reserved license only at the beginning of the timeframe, only after a stop of the product, only at the approaching of the end time of the timeframe, or in any combination thereof. Of course, nothing prevents the allocation of the reserved license to the workstation for the whole timeframe irrespectively of its use.

Alternatively, the workstations to which the release request is broadcast may be selected with other criteria (for example, according to the actual use of the product in the relevant timeframe); however, it is also possible to send the release request indiscriminately to all the workstations that have reserved the license for the selected timeframe.

In a different implementation of the invention, the priorities may be managed with a more sophisticated algorithm, which selects the reserved licenses to be released according to multiple parameters (such as the time of submission of the respective reservation request).

In any case, the time-out for refusing the reservation request may be set in another way (for example, as a percentage of the difference between the start time of the timeframe and the current time).

Alternatively, the reserved licenses to be released (either in a voluntary or preemptive manner) may be selected in a different way; for example, it is possible to identify sets of reserved licenses which timeframes partially overlap the desired period. However, the solution according to the present invention lends itself to be put into practice even without the possibility of requesting the other workstations to release the reserved licenses and/or without any priority mechanism (for example, allowing the workstation to contact alternative runtime servers when the required license is not available).

Moreover, the alternative timeframes may be determined with more sophisticated techniques (such as based on operative research algorithms); it is also possible to identify two or more shorter periods which total length amounts to the desired timeframe. As a possible development, orchestration solutions may be exploited for planning the use of the licenses according to a number of different aspects (such as business needs).

Similar considerations apply if the program (which may be used to implement the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (for example, with similar or additional steps). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A computer implemented method for controlling usage of digitally encoded products in a data processing system, each product being associated with a set of usage rights for enabling data processing entities to which the usage rights are assigned to use the product, wherein the computer implemented method includes the steps of:

receiving by the data processing system a reservation request to use a selected product for a selected timeframe by an entity, wherein a start time of the selected timeframe is delayed with respect to the reservation request, and wherein the reservation request specifies the start time and an end time of the selected timeframe;

reserving a usage right for the entity to use the selected product for the selected timeframe in response to the reservation request thereby preventing assigning the reserved usage right for the selected timeframe to other entities, the usage right remaining available for assignment to the other entities until the start time of the selected timeframe, wherein the reserved usage right is one usage right out of a predetermined, limited number of usage rights associated with the selected product;

assigning the reserved usage right to the entity for the selected timeframe;

verifying an availability of at least one usage right to use the selected product for the selected timeframe;

attempting to release at least one reserved usage right relating to the selected timeframe in response to a non-availability of at least one usage right;

reserving the at least one released usage right to the entity in response to the release within a predefined delay; and refusing the reservation request in response to the release not occurring within the predefined delay, wherein the step of attempting includes:

requesting a set of the further entities to release the at least one reserved usage right; and releasing the at least one reserved usage right in response to acceptance of the request to release by at least one further entity of the set.

2. The computer implemented method according to claim 1, wherein each reserved usage right is reserved to a corresponding further entity of the further entities for a corresponding predefined further timeframe, the step of requesting including:

selecting the set of the further entities according to a residual duration of the corresponding predefined further timeframe for each corresponding further entity.

3. A computer implemented method for controlling usage of digitally encoded products in a data processing system, each product being associated with a set of usage rights for enabling data processing entities to which the usage rights are assigned to use the product, wherein the computer implemented method includes the steps of:

receiving by the data processing system a reservation request to use a selected product for a selected timeframe by an entity, wherein a start time of the selected timeframe is delayed with respect to the reservation request, and wherein the reservation request specifies the start time and an end time of the selected timeframe;

reserving a usage right for the entity to use the selected product for the selected timeframe in response to the reservation request thereby preventing assigning the reserved usage right for the selected timeframe to other entities, the usage right remaining available for assignment to the other entities until the start time of the selected timeframe, wherein the reserved usage right is one usage right out of a predetermined, limited number of usage rights associated with the selected product;

assigning the reserved usage right to the entity for the selected timeframe;

verifying an availability of at least one usage right to use the selected product for the selected timeframe;

attempting to release at least one reserved usage right relating to the selected timeframe in response to a non-availability of at least one usage right;

reserving the at least one released usage right to the entity in response to the release within a predefined delay; and refusing the reservation request in response to the release not occurring within the predefined delay, wherein the step of attempting includes:

selecting at least one reserved usage right having a priority lower than a priority of the reservation request; and releasing the at least one selected reserved usage right.

4. A computer implemented method for controlling usage of digitally encoded products in a data processing system, each product being associated with a set of usage rights for enabling data processing entities to which the usage rights are assigned to use the product, wherein the computer implemented method includes the steps of:

receiving by the data processing system a reservation request to use a selected product for a selected timeframe by an entity, wherein a start time of the selected timeframe is delayed with respect to the reservation request, and wherein the reservation request specifies the start time and an end time of the selected timeframe;

reserving a usage right for the entity to use the selected product for the selected timeframe in response to the reservation request thereby preventing assigning the reserved usage right for the selected timeframe to other entities, the usage right remaining available for assignment to the other entities until the start time of the selected timeframe, wherein the reserved usage right is one usage right out of a predetermined, limited number of usage rights associated with the selected product;

assigning the reserved usage right to the entity for the selected timeframe;

responsive to a determination that at least one usage right of the selected product is not available for the selected timeframe, the data processing system determining at least one alternative timeframe for which at least one usage right of the selected product is not reserved; and suggesting the at least one alternative timeframe to the entity.

* * * * *